(12) United States Patent
Wada et al.

(10) Patent No.: US 9,856,625 B2
(45) Date of Patent: Jan. 2, 2018

(54) WORKING VEHICLE

(71) Applicant: Komatsu Ltd., Minato-Ku, Tokyo (JP)

(72) Inventors: Minoru Wada, Mooka (JP); Toshiyuki Ohta, Hitachinaka (JP); Toshimitsu Honda, Hitachinaka (JP); Katsuhiro Tsutsumi, Hitachinaka (JP); Takaya Kobayashi, Hitachinaka (JP); Yosuke Yamagoe, Toukai-mura (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 86 days.

(21) Appl. No.: 15/026,173

(22) PCT Filed: Aug. 7, 2015

(86) PCT No.: PCT/JP2015/072499
§ 371 (c)(1),
(2) Date: Mar. 30, 2016

(87) PCT Pub. No.: WO2016/006716
PCT Pub. Date: Jan. 14, 2016

(65) Prior Publication Data
US 2017/0037594 A1 Feb. 9, 2017

(51) Int. Cl.
*E02F 3/40* (2006.01)
*E02F 3/43* (2006.01)
(Continued)

(52) U.S. Cl.
CPC .............. *E02F 3/431* (2013.01); *E02F 3/283* (2013.01); *E02F 3/40* (2013.01); *E02F 3/422* (2013.01);
(Continued)

(58) Field of Classification Search
CPC . E02F 3/431; E02F 3/422; E02F 3/283; E02F 3/40; E02F 3/43; F15B 11/20; F15B 11/161
See application file for complete search history.

(56) References Cited

U.S. PATENT DOCUMENTS 5,528,843 A * 6/1996 Rocke ..................... E02F 3/434
172/2
6,064,933 A * 5/2000 Rocke ..................... E02F 3/434
172/12
(Continued)

FOREIGN PATENT DOCUMENTS

EP 2853641 4/2015
JP S62-185928 8/1987
(Continued)

OTHER PUBLICATIONS

International Search Report and Written Opinion in International Application No. PCT/JP2015/072499, dated Oct. 6, 2015, 13 pages.

*Primary Examiner* — Michael J Zanelli
(74) *Attorney, Agent, or Firm* — Fish & Richardson P.C.

(57) ABSTRACT

A working vehicle includes: a vehicle body; and a boom; a bucket; a boom driving unit including a boom cylinder; a bucket driving unit configured to swing the bucket; a boom-bottom pressure sensor configured to detect a boom-bottom pressure of the boom cylinder; and a working equipment controller configured to control at least one of a lift motion of the boom and a tilt motion of the bucket. The bucket includes an inclined portion. The working equipment controller controls the lift motion or the tilt motion by comparing a threshold set in accordance with an inclination angle of the inclined portion with the boom-bottom pressure.

5 Claims, 14 Drawing Sheets

(51) Int. Cl.
  *F15B 11/20* (2006.01)
  *E02F 3/28* (2006.01)
  *E02F 3/42* (2006.01)
  *F15B 11/16* (2006.01)

(52) U.S. Cl.
  CPC .............. *E02F 3/43* (2013.01); *F15B 11/161* (2013.01); *F15B 11/20* (2013.01)

(56) References Cited

U.S. PATENT DOCUMENTS

| | | | | |
|---|---|---|---|---|
| 6,879,899 | B2* | 4/2005 | Budde | E02F 3/432 |
| | | | | 172/2 |
| 7,289,896 | B2* | 10/2007 | Ikari | E02F 3/432 |
| | | | | 701/50 |
| 2012/0301258 | A1* | 11/2012 | Nagata | E02F 3/40 |
| | | | | 414/723 |
| 2013/0067779 | A1 | 3/2013 | Mills et al. | |
| 2014/0129093 | A1* | 5/2014 | Shirao | E02F 3/432 |
| | | | | 701/50 |

FOREIGN PATENT DOCUMENTS

| | | |
|---|---|---|
| JP | H05-65723 | 3/1993 |
| JP | 2013-526664 | 6/2013 |
| JP | 5700613 | 4/2015 |
| WO | WO 2014/171024 | 10/2014 |

* cited by examiner

WORKING VEHICLE

CROSS-REFERENCE TO RELATED APPLICATION

This application is a National Stage Application under 35 U.S.C. §371 and claims the benefit of International Application No. PCT/JP2015/072499, filed Aug. 7, 2015. The disclosure of the foregoing application is hereby incorporated by reference in its entirety.

TECHNICAL FIELD

The present invention relates to a working vehicle.

BACKGROUND ART

A working vehicle is provided with working equipment for loading, for instance, soil and sand or crushed rocks onto a dump truck or the like. Such a working vehicle may be a wheel loader. The wheel loader is a bucket-equipped vehicle configured to travel using tires. In order to reduce a burden on an operator in performing an excavation work using the wheel loader, a motion of the bucket may be automatically controlled to excavate (see, for instance, Patent Literature 1).

In the automatic excavation control disclosed in Patent Literature 1, when a bottom pressure, which is a pressure of a hydraulic oil supplied to a boom hydraulic cylinder, a driving speed of the working vehicle and a boom angle satisfy auto lift start conditions, an auto lift control of a boom is started. Similarly, when the bottom pressure of the boom hydraulic cylinder and the driving speed of the working vehicle satisfy auto tilt start conditions, an auto tilt control of the bucket is started.

CITATION LIST

Patent Literature(s)

Patent Literature 1: Japanese Patent No. 5700613

SUMMARY OF THE INVENTION

Problem(s) to be Solved by the Invention

In addition to the excavation work, the wheel loader sometimes performs a grading work (e.g., ground leveling), which also increases the bottom pressure. Accordingly, the wheel loader needs to be set not to start the automatic excavation control in response to an increase in the bottom pressure during the grading work.

Thus, a threshold to be compared with the bottom pressure is set high so that the auto lift control or the auto tilt control is started only during the automatic excavation work.

However, when the threshold is set high, the auto lift control or the auto tilt control cannot be started until the bottom pressure reaches a high value, which results in delay of the timing of the start of the control. The control cannot thus be started until a bucket-thrusting distance relative to an object such as soil and sand becomes large, so that the auto lift control or the auto tilt control cannot be started at an optimal timing. Consequently, an operating efficiency cannot be sufficiently improved under the automatic excavation control.

An object of the invention is to provide a working vehicle capable of improvement in an operating efficiency during an automatic excavation control.

Means for Solving the Problem(s)

According to a first aspect of the invention, a working vehicle includes: a vehicle body; a boom swingably supported by the vehicle body; a bucket swingably supported by the boom; a boom driving unit configured to swing the boom, the boom driving unit including a boom hydraulic cylinder; a bucket driving unit configured to swing the bucket; a boom-bottom pressure detector configured to detect a boom-bottom pressure of the boom hydraulic cylinder; and a controller configured to control at least one of a lift motion of the boom and a tilt motion of the bucket, the bucket including a bottom plate, the bottom plate including an inclined portion inclined upward toward an innermost of the bucket when a bottom surface of the bottom plate is set horizontal, the controller controlling the lift motion or the tilt motion by comparing a threshold set in accordance with an inclination angle of the inclined portion relative to the bottom surface with the boom-bottom pressure.

In the above aspect of the invention, the bottom plate of the bucket includes the inclined portion. Thus, when the bucket is thrust into an object to be excavated (e.g., soil and sand), a horizontal reaction force applied to the boom via the bucket from the object to be excavated is increased and, consequently, an increase ratio of the boom-bottom pressure of the boom hydraulic cylinder is increased. Therefore, even when the threshold to be compared with the bottom pressure is set high so that a grading work is distinguishable, the time elapsed before the bottom pressure exceeds the threshold is shortened, thereby allowing the controller to start the automatic control of the lift motion of the boom or the tilt motion of the bucket at an early timing. Thus, the lift motion or the tilt motion under the automatic control is likely to be started at an optimal thrusting distance of the bucket relative to the object to be excavated, thereby improving the operating efficiency during an automatic excavation control. In particular, the threshold is set in accordance with the inclination angle of the inclined portion. Therefore, even when a variation in the bottom pressure is changed with a change in the inclination angle, the lift motion or the tilt motion can be started at an optimal timing in accordance with the variation, thereby improving the operating efficiency under the automatic excavation control.

Further, the increased horizontal reaction force lowers the speed of the working vehicle, so that an operator can easily operate the working vehicle at the right timing, which also results in an improvement in the operation efficiency under the automatic excavation control.

In the above aspect, it is preferable that the bottom plate further includes a straight portion extending continuously from a front edge of the inclined portion.

In the above aspect, it is preferable that the inclination angle is in a range from four degrees to eight degrees.

In the above aspect, it is preferable that the controller controls the lift motion of the boom by comparing a first threshold set in accordance with the inclination angle of the inclined portion relative to the bottom surface with the boom-bottom pressure, and controls the tilt motion of the bucket by comparing a second threshold set in accordance with the inclination angle of the inclined portion relative to the bottom surface with the boom-bottom pressure.

According to a second aspect of the invention, a working vehicle includes: a vehicle body; a boom swingably supported by the vehicle body; a bucket swingably supported by the boom; a boom driving unit configured to swing the boom; a bucket driving unit configured to swing the bucket; a horizontal reaction force detector configured to detect a horizontal reaction force applied when the bucket is thrust into an object to be loaded in the bucket; and a controller configured to control at least one of a lift motion of the boom and a tilt motion of the bucket, the bucket including a bottom plate, the bottom plate including an inclined portion inclined upward toward an innermost of the bucket when a bottom surface of the bottom plate is set horizontal, the controller controlling the lift motion or the tilting motion by comparing a threshold set in accordance with an inclination angle of the inclined portion relative to the bottom surface with the horizontal reaction force.

BRIEF DESCRIPTION OF DRAWING(S)

Figure 5:
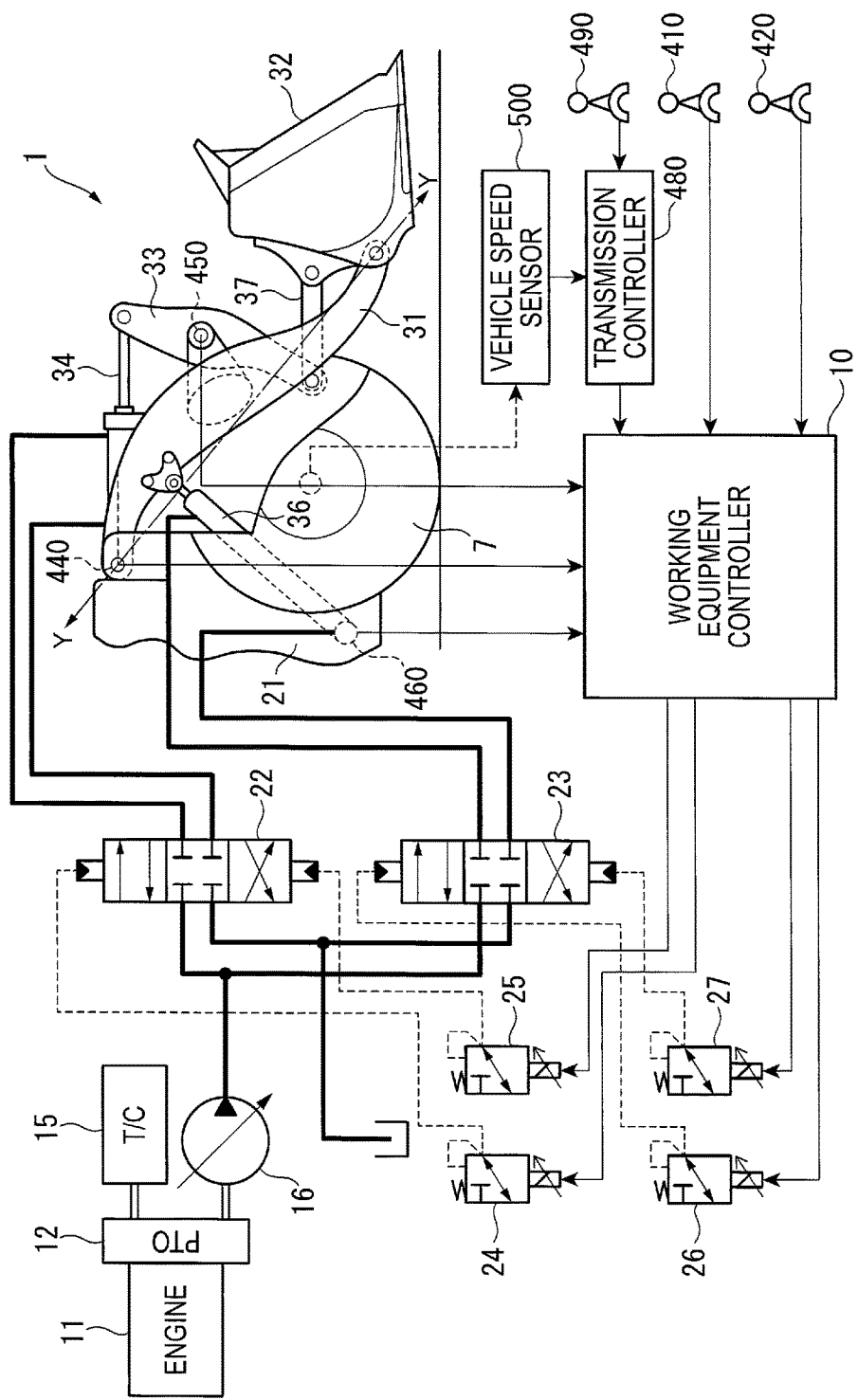

FIG. 5 schematically illustrates a drive mechanism for working equipment.

Figure 6:
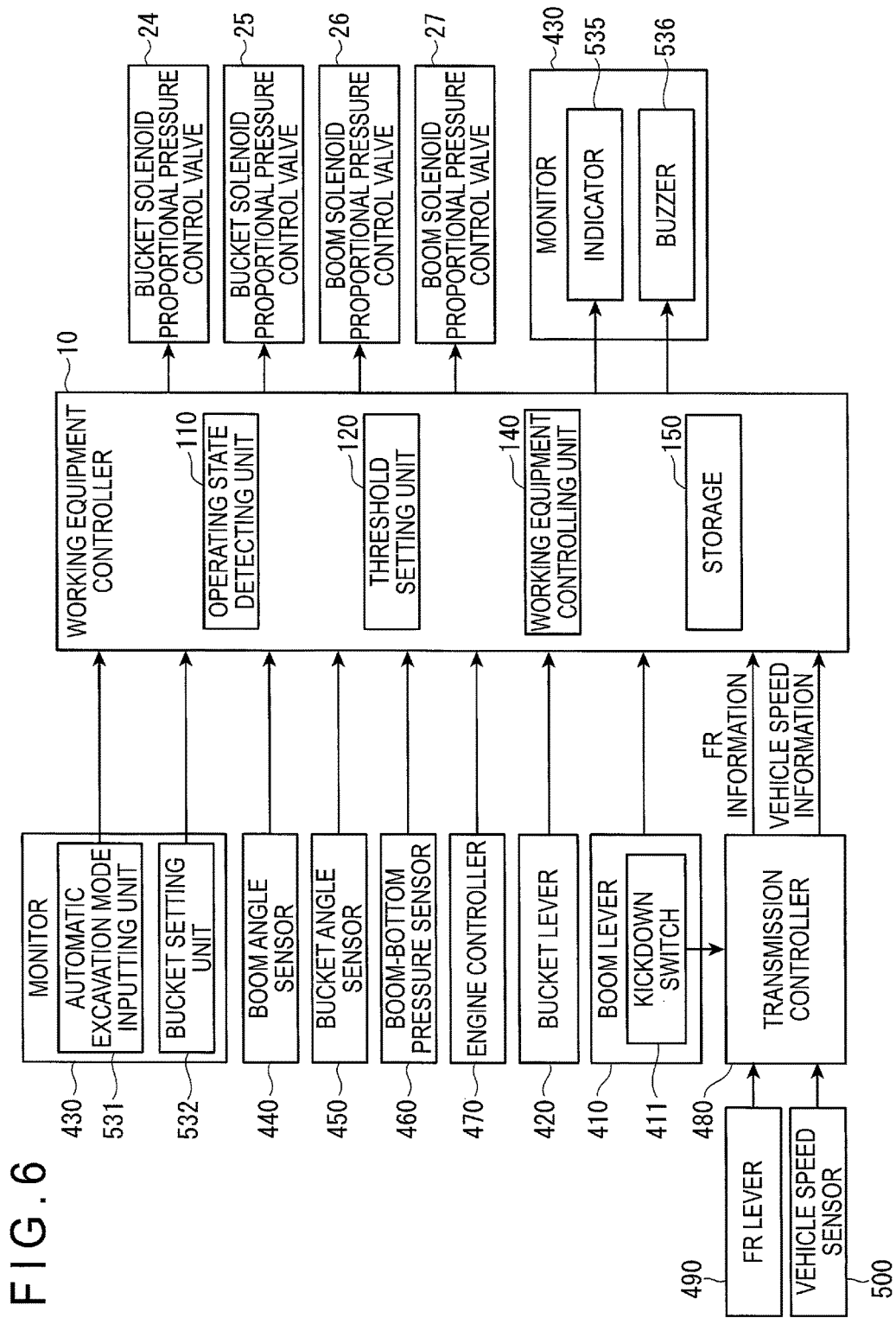

FIG. 6 is a block diagram showing an arrangement of a working equipment controller.

Figure 7:
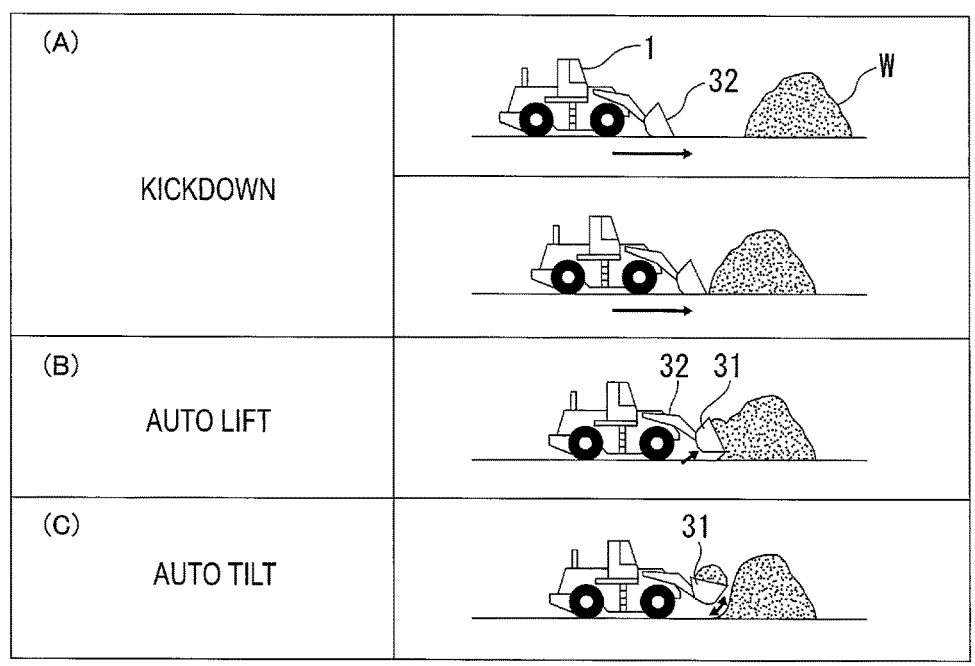

FIG. 7 schematically illustrates a process of an automatic excavation work.

Figure 8:
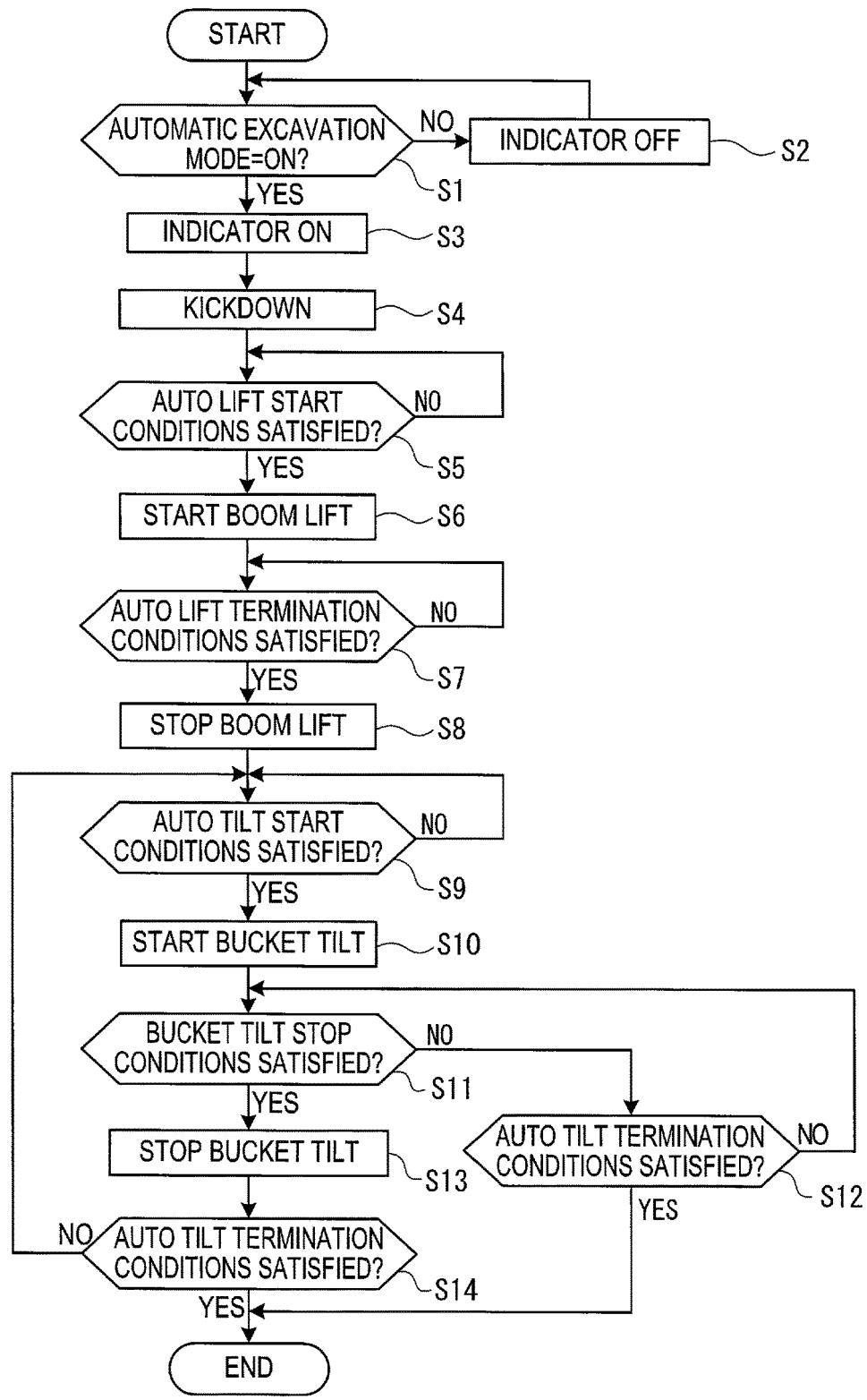

FIG. 8 is a flow chart showing the process of the automatic excavation work.

Figure 9:
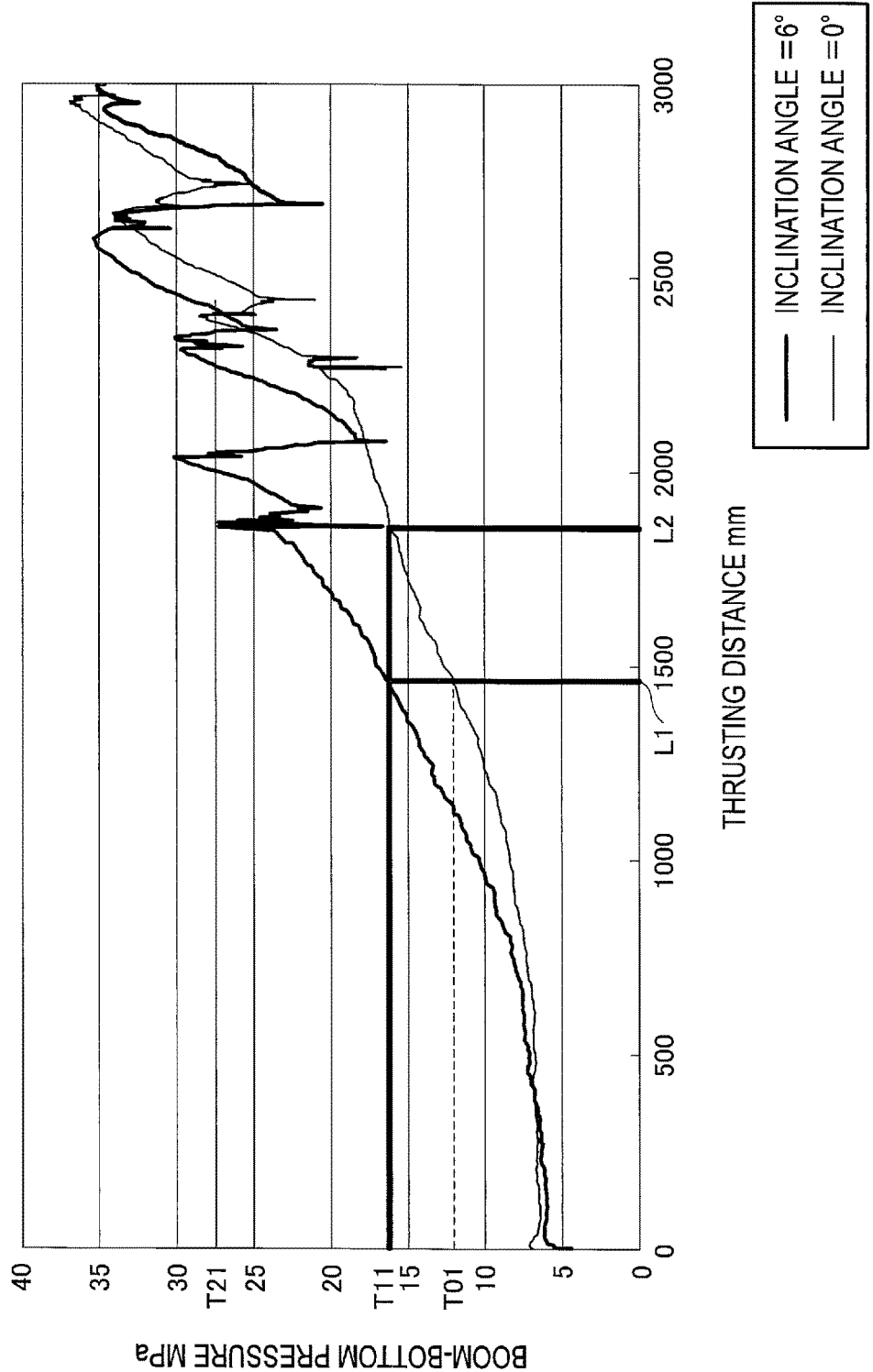
Figure 10:
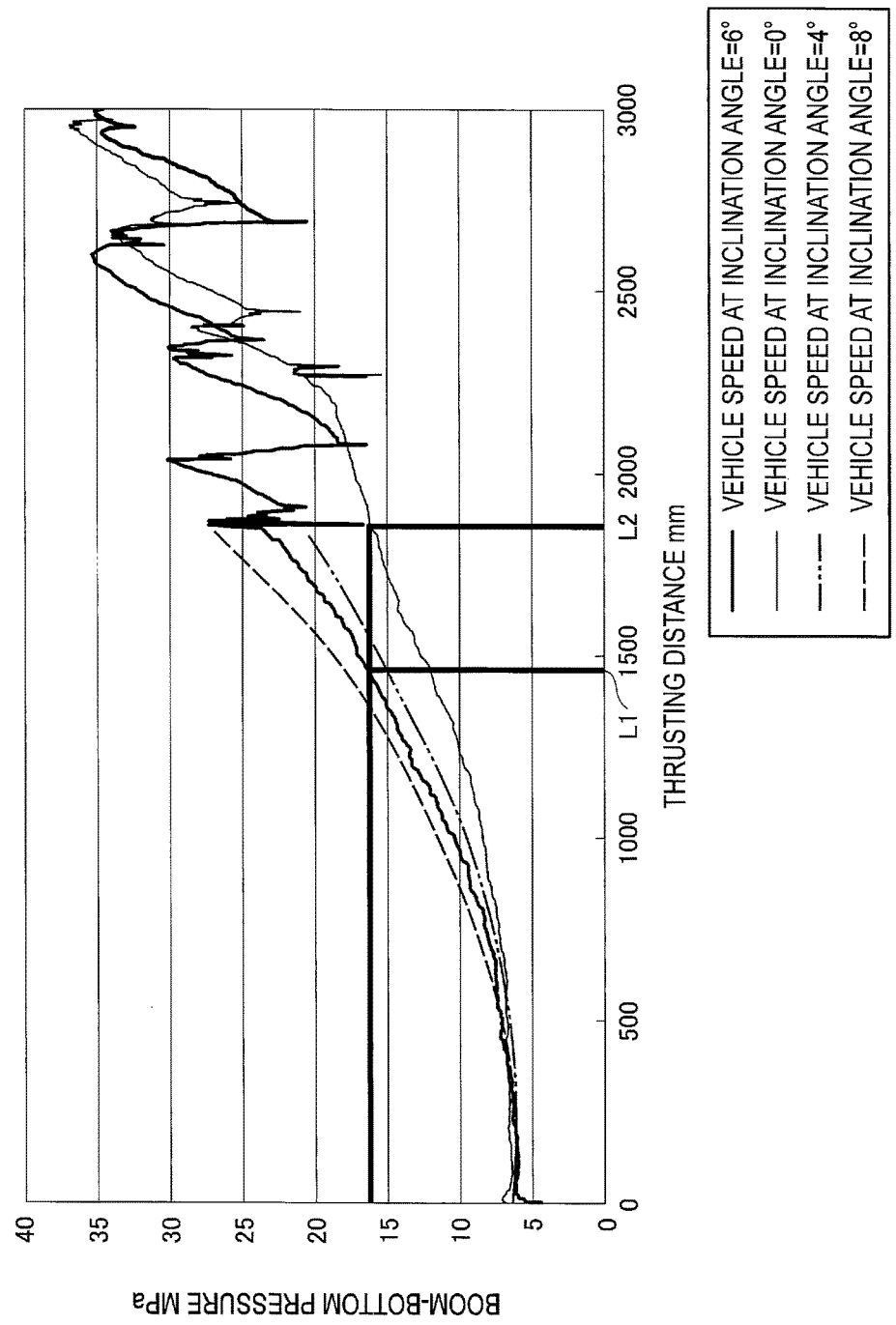
Figure 11:
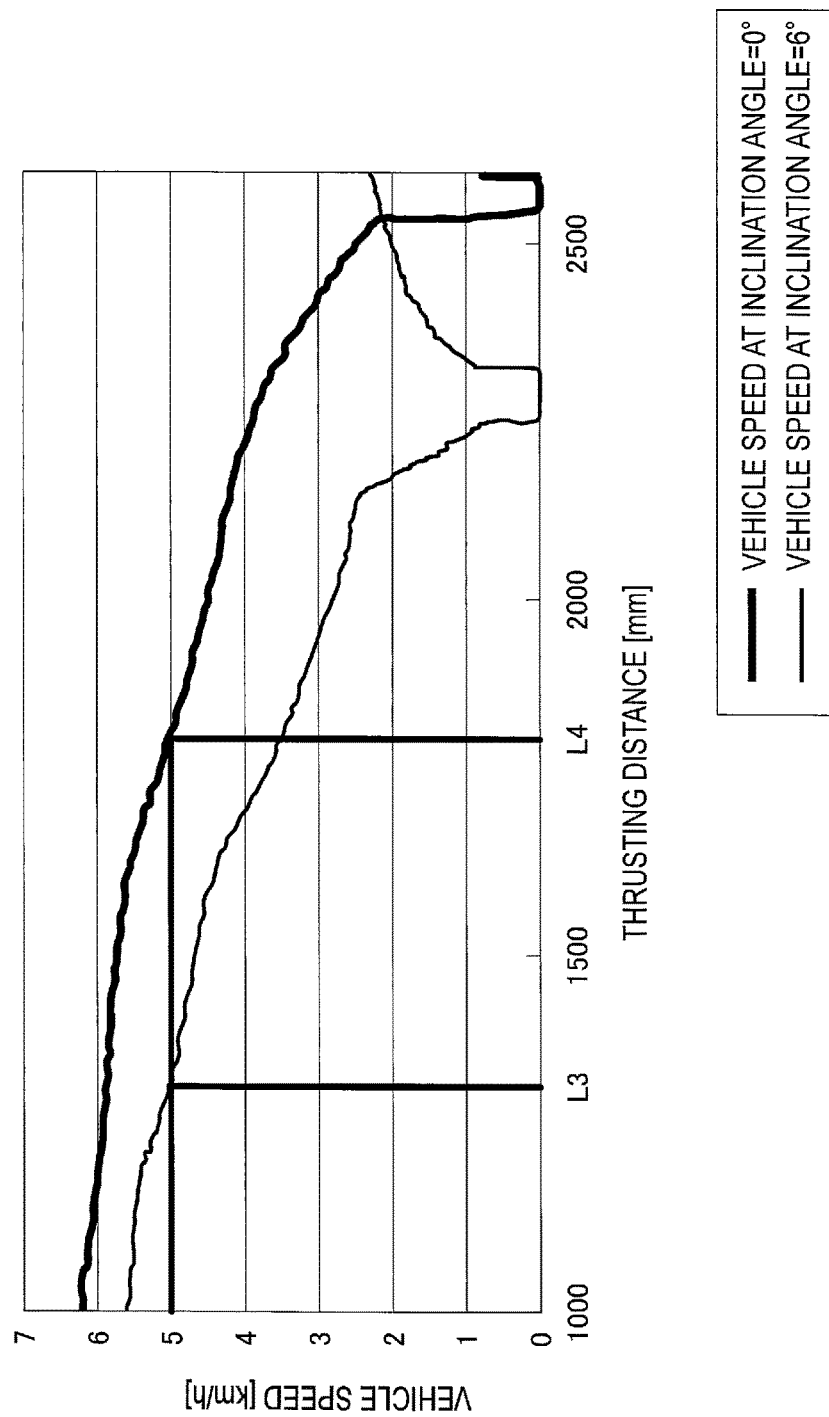

FIG. 9 is a graph showing a relationship between a boom-bottom pressure and a thrusting distance FIG. 10 is a graph showing a relationship between the boom-bottom pressure and the thrusting distance FIG. 11 is a graph showing a relationship between a vehicle speed and the thrusting distance.

Figure 12:
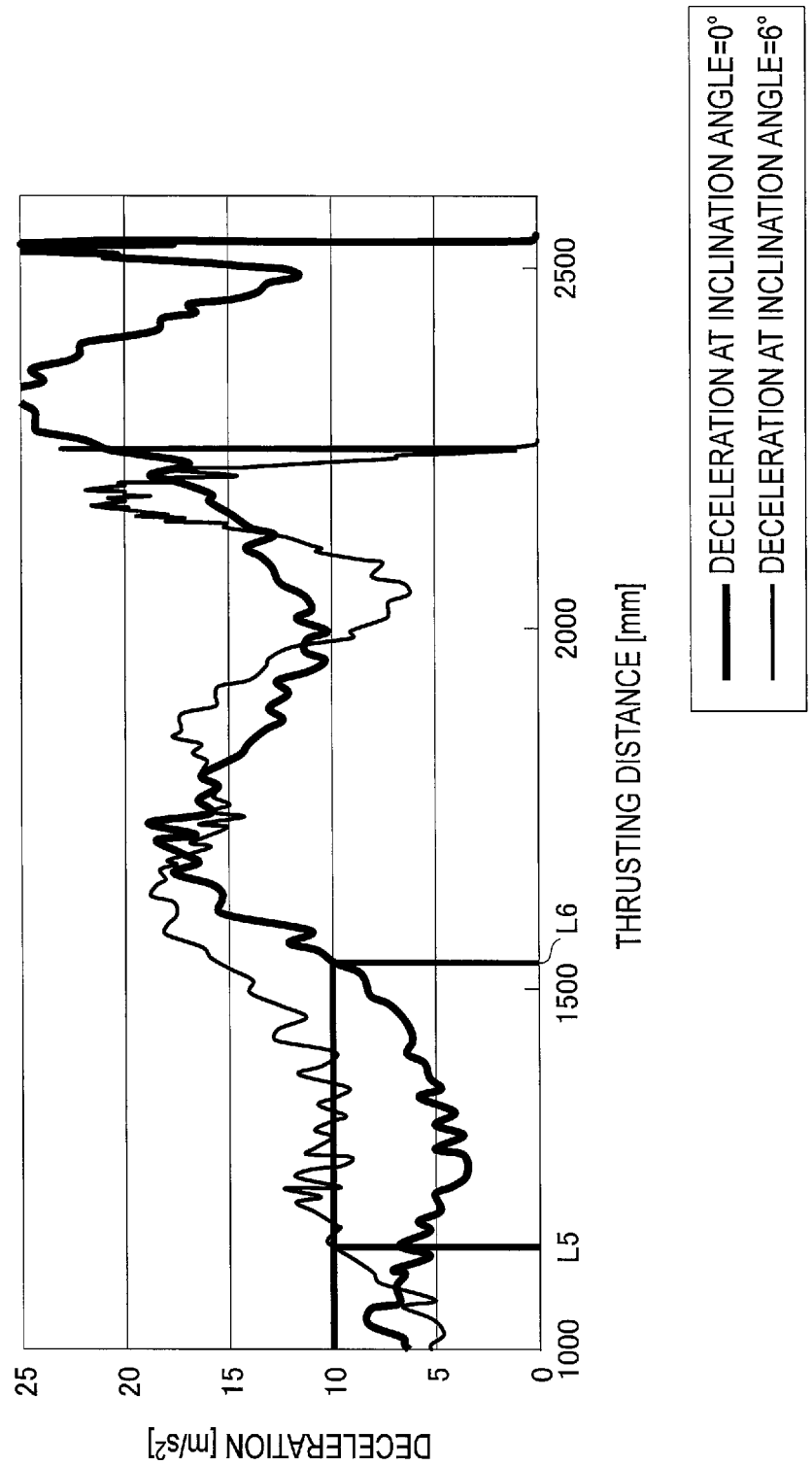

FIG. 12 is a graph showing a relationship between a deceleration and the thrusting distance.

Figure 13:
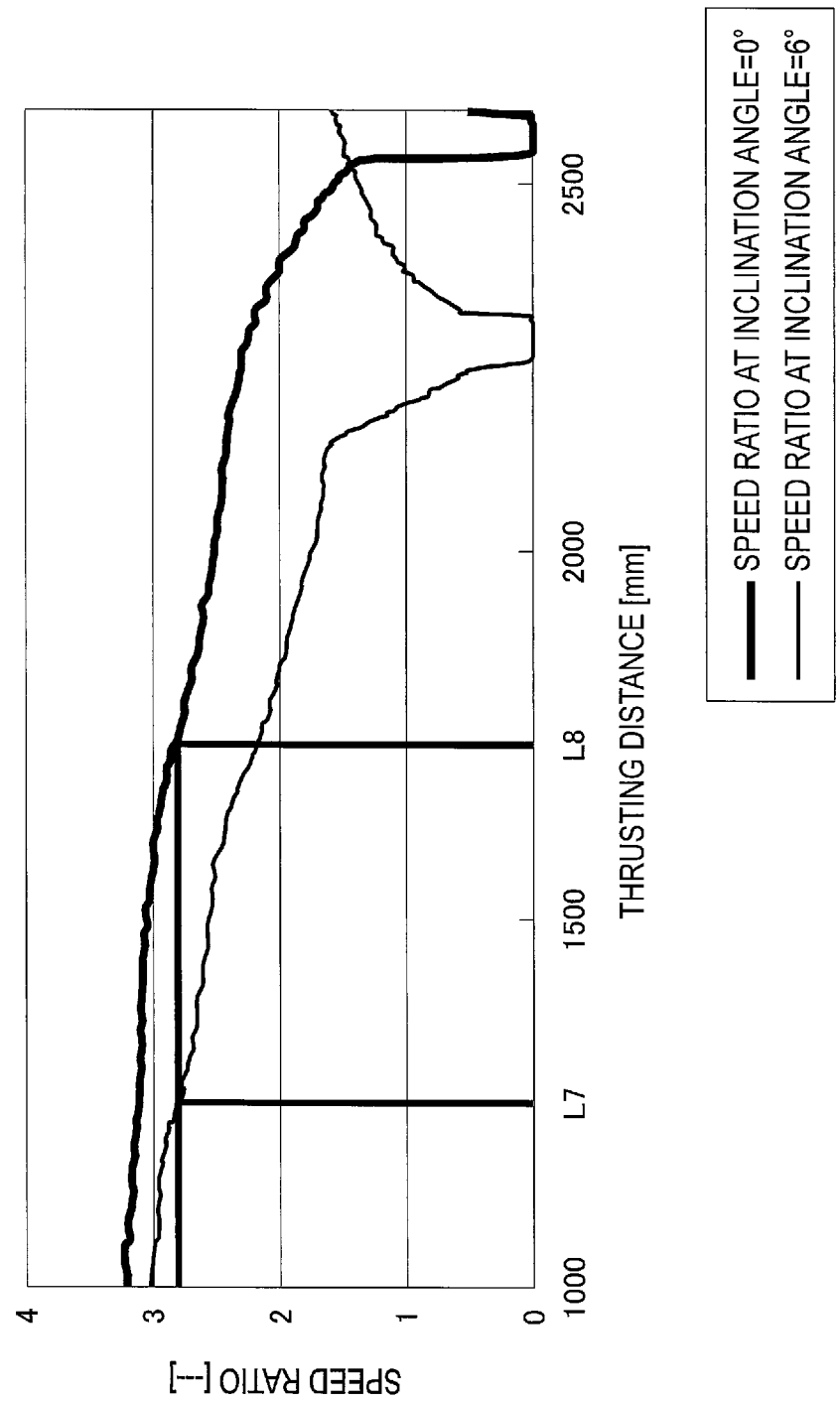

FIG. 13 is a graph showing a relationship between a speed ratio and the thrusting distance.

Figure 14:
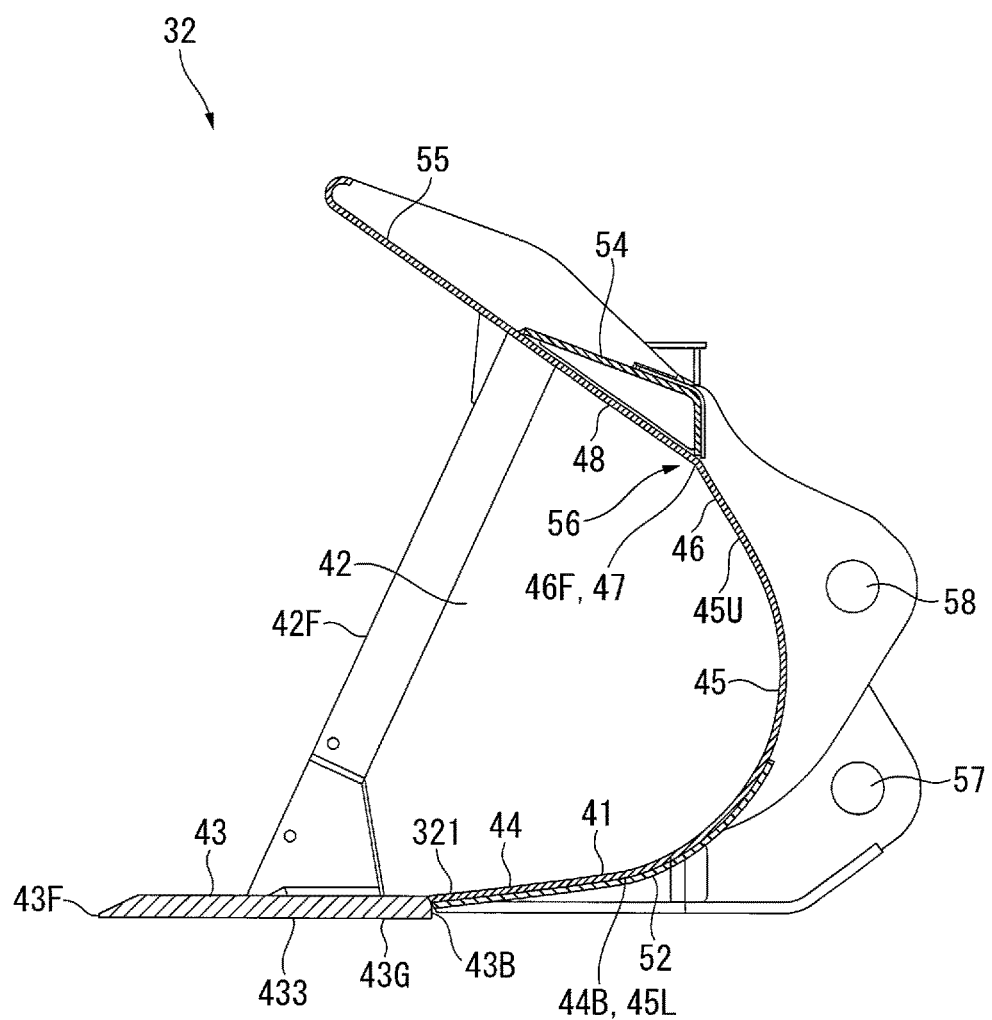

FIG. 14 is a sectional view showing a modification of the bucket.

DESCRIPTION OF EMBODIMENT(S)

An exemplary embodiment of the invention will be described below with reference to the attached drawings.

Figure 1:
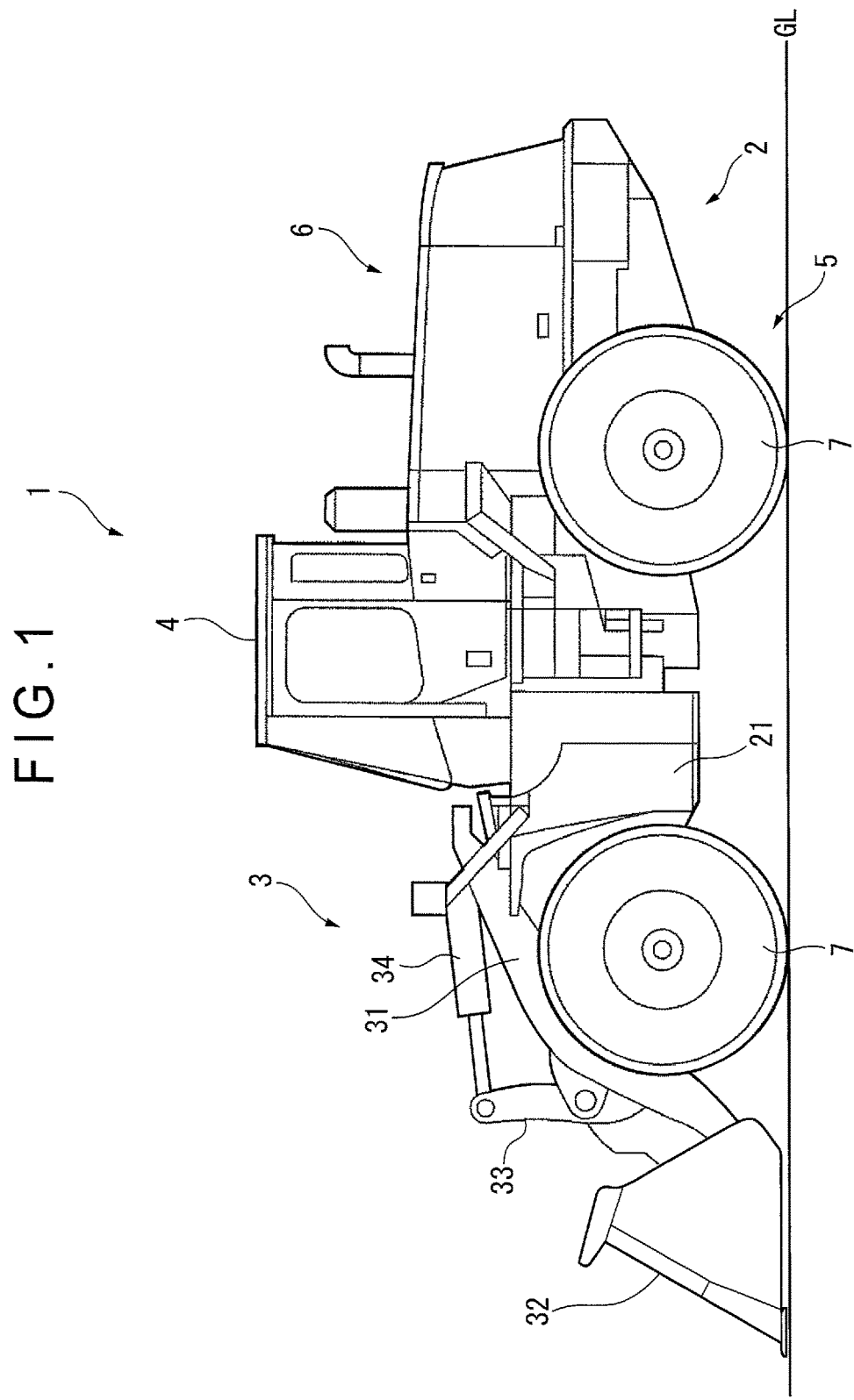
FIG. 1 is a side view showing a working vehicle according to an exemplary embodiment of the invention.

FIG. 1 is a side view showing a wheel loader 1 (working vehicle) according to the exemplary embodiment. It should be noted that, in the figures, directions are determined with reference to an operator in an operating state for the wheel loader 1. Specifically, a vehicle front-rear direction is simply referred to as a front-rear direction, a vehicle width direction is referred to as a right-left direction, and a vehicle up-down (vertical) direction is simply referred to as an up-down (vertical) direction. Further, an innermost of the bucket means a rear side relative to a bucket opening.

Description of Overall Arrangement of Wheel Loader

As shown in FIG. 1, the wheel loader 1 includes a vehicle body 2, working equipment 3, a cab 4, a travel device 5, and a power unit 6.

The vehicle body 2 includes a steel front vehicle body frame 21 that supports the working equipment 3 and a steel rear vehicle body frame that supports the cab 4 and the power unit 6. The working equipment 3 is provided on a front side of the front vehicle body frame 21. The travel device 5 includes tires 7, which are driven to control the travel of the wheel loader 1.

The working equipment 3 is described in detail. The working equipment 3 includes a boom 31 pivotally supported by the front vehicle body frame 21, a bucket 32 vertically pivotally supported by the boom 31, and a bell crank 33 pivotally supported by the boom 31 at a middle of the boom 31.

The boom 31, which includes right and left pair of booms, is pivotally supported to be vertically swingable relative to the front vehicle body frame 21. A boom hydraulic cylinder, i.e., a boom cylinder 36 (FIG. 5), is supported at the middle of the boom 31, the boom cylinder 36 having a base end portion pivotally supported by the front vehicle body frame 21. Hydraulic extension and retraction of the boom cylinder 36 causes the boom 31 to be vertically swung.

Figure 3:
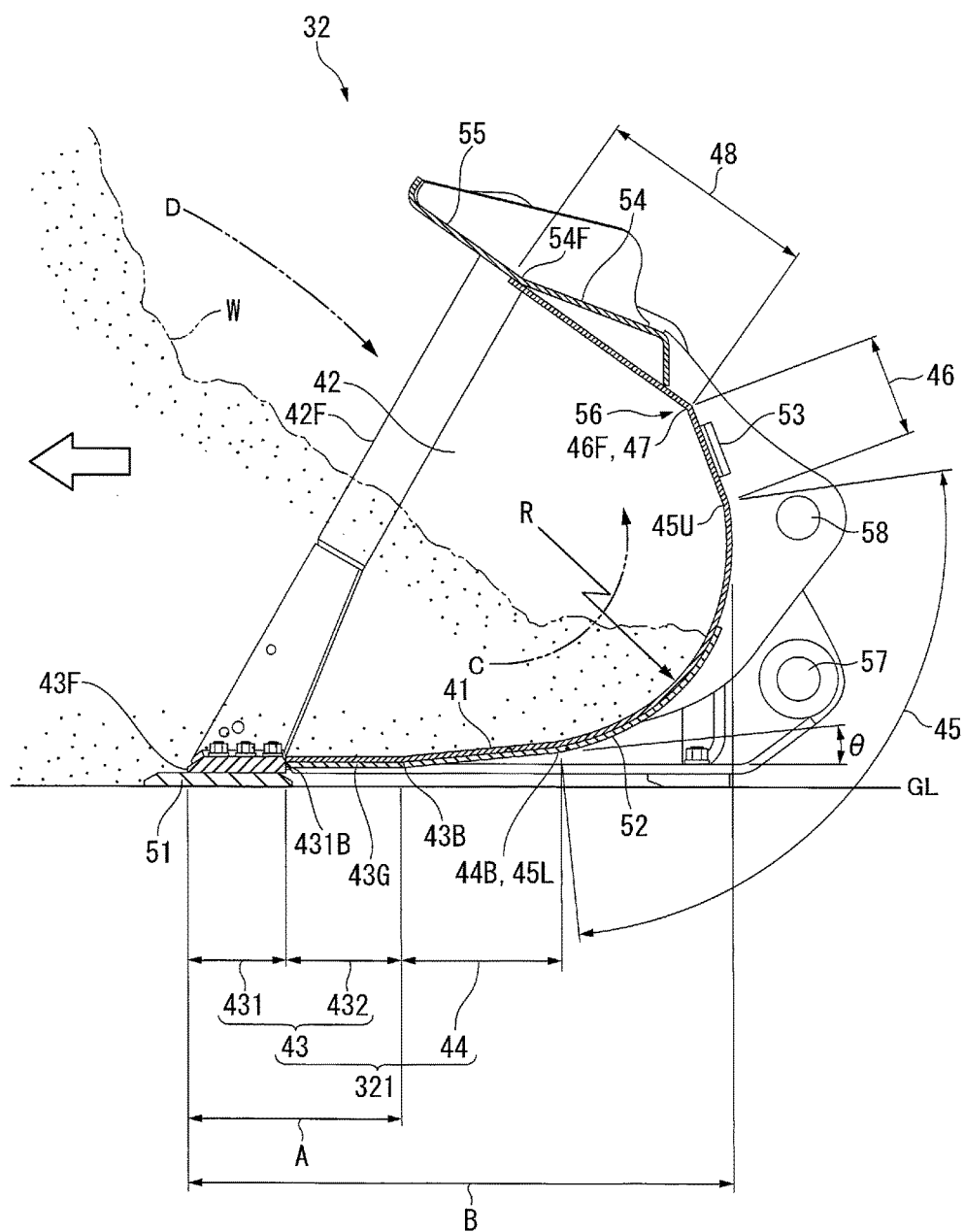
FIG. 3 is a cross sectional view showing the bucket.

The bucket 32 is adapted to be loaded with an object to be excavated such as excavated soil (W in FIGS. 3 and 7). The bucket 32 has a link 37 (FIG. 5) that is pivotally supported above a position where the bucket 32 is pivotally supported by the boom 31. An opposite end of the link 37 is pivotally supported at a lower end of the bell crank 33.

The lower end of the bell crank 33, which is pivotally supported between the pair of booms 31, is connected to a base end portion of the link 37. A bucket cylinder 34 is pivotally supported at an upper end of the bell crank 33. A base end portion of the bucket cylinder 34 is pivotally supported by the front vehicle body frame 21.

The bucket 32 is positioned to be slightly in contact with a ground surface GL and thrust into a pile of blasted rocks or a ground (a white arrow in FIG. 3 shows a thrusting direction). When the boom cylinder 36 is extended, the boom 31 is swung upward with the bucket 32 being loaded with the object to be excavated (FIG. 3) (i.e., a lift motion of the boom 31).

Hydraulic extension and retraction of the bucket cylinder 34 causes the bucket 32 to be rotated (i.e., a tilt motion of the bucket 32). Shoveling of, for instance, soil and sand and excavation can thus be performed.

Further, when the bucket cylinder 34 is retracted with the bucket 32 being positioned above, an upper end portion of the bell crank 33 is rotated toward the vehicle body 2, while a lower end portion thereof is rotated toward a vehicle front side. The link then pushes an upper portion of the bucket 32 toward the vehicle front side, thereby rotating the bucket 32 to dump the object to be excavated loaded in the bucket 32.

Specific Description of Bucket

Figure 2:
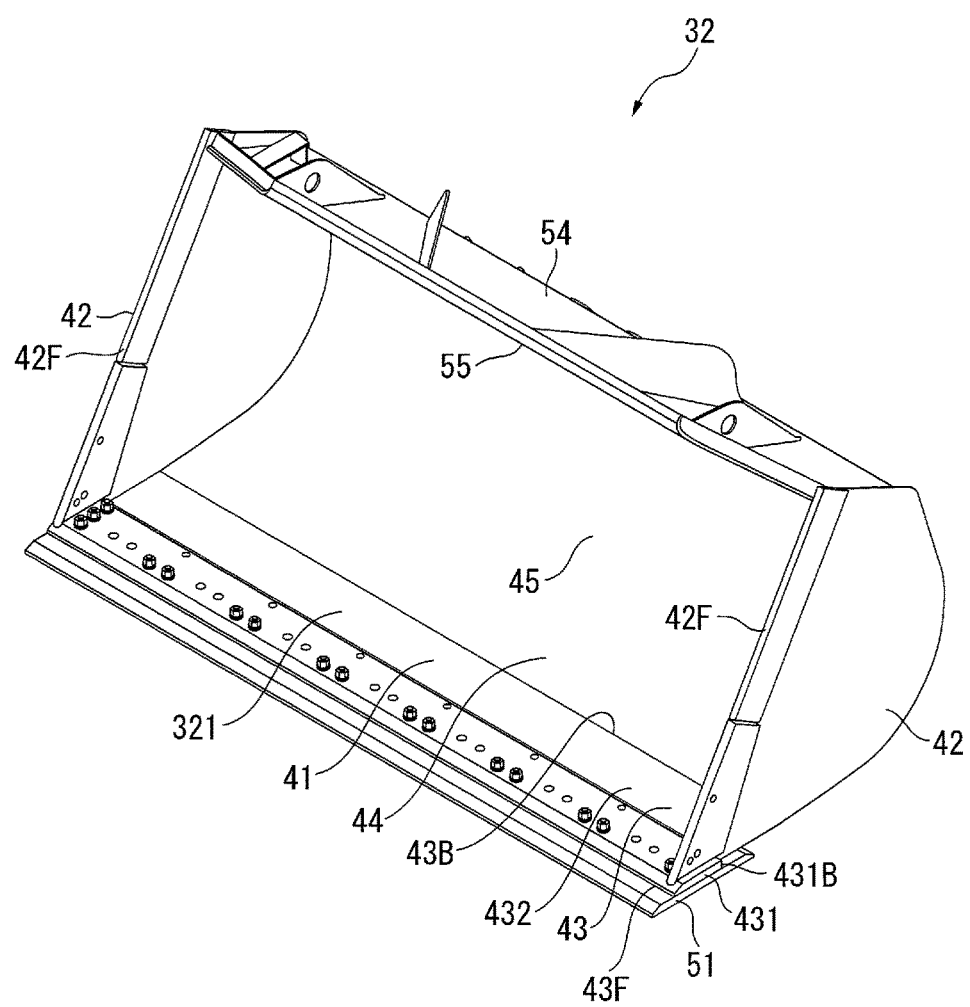
FIG. 2 is a perspective view showing the entirety of a bucket provided to the working vehicle.

FIG. 2 is a perspective view showing the entirety of the bucket 32. FIG. 3 is a sectional view showing a side of the bucket 32 with a bottom surface 43G of a bottom plate 321 being set horizontal.

As shown in FIGS. 2 and 3, the bucket 32, a lower front edge 43F of which is in the form of a linear flat blade, includes a main plate 41 continuous from a lower side to an upper side of the bucket opening, and a pair of side plates 42 covering right and left sides of the main plate 41. A lower portion of each of the side plates 42 may be attached with a side edge guard (not shown).

The main plate 41 includes: a first straight portion 43 horizontally extending from the lower front edge 43F toward the innermost of the bucket; a flat inclined portion 44 continuously further extending from a rear edge 43B of the first straight portion 43 toward the innermost of the bucket while being inclined upward toward the innermost of the bucket; a curve 45 with a predetermined bucket radius R having a lower edge 45L continuous with a rear edge 44B of the inclined portion 44; a second straight portion 46 continuous with an upper edge 45U of the curve 45 and inclined upward toward the bucket opening; and a third straight portion 48 bent at a bent portion 47 toward the bucket opening relative to a front edge 46F of the second straight portion 46 and further extending toward the bucket opening. The first straight portion 43 and the inclined portion 44 provide the bottom plate 321 of the bucket 32.

The first straight portion 43 includes a plate-shaped attachment portion 431 including the lower front edge 43F and a plate-shaped bottom 432 continuous with a rear edge 431B of the plate-shaped attachment portion 431, and defines the bottom surface 43G. The plate-shaped attachment portion 431, which is a thick steel plate elongated along the right-left direction, has a lower surface to which a bottom guard 51 is bolted. The plate-shaped bottom 432, the inclined portion 44, the curve 45, the second straight portion 46, the bent portion 47 and the third straight portion 48 are made of a single steel plate, and a laminated plate 52 is additionally layered over a range from the plate-shaped bottom 432 to a part of the curve 45 to reinforce them.

An angle θ between the inclined portion 44 and the first straight portion 43 (the bottom surface 43G of the first straight portion 43 in the exemplary embodiment) is four degrees or more, preferably in a range from four degrees to eight degrees. When the angle is less than four degrees, the object to be excavated pushed to the curve 45 from the first straight portion 43 through the inclined portion 44 is unlikely to smoothly slide between the inclined portion 44 and the curve 45 toward the innermost of the bucket. In contrast, when the angle exceeds eight degrees, the bucket 32 is inevitably thrust into the object to be excavated with an increased resistance, and thus the operation cannot be smoothly performed. Further, the object pushed into the innermost of the bucket is likely to roll toward the bucket opening.

The bucket radius R of the curve 45 is large as compared with a typical bucket radius. The curve 45 is continuous with the rear side of the inclined portion 44 to be defined at a higher level than that of a typical bucket. The inclined portion 44 provided before the curve 45 is continuous with the curve 45 having the bucket radius R in a tangent direction.

A ratio (A/B) between a horizontal length A of the first straight portion 43 and a horizontal length B from the lower front edge 43F to the most-projecting portion of the curve 45 toward the innermost of the bucket is in a range from 0.3 to 0.5.

For instance, when the ratio falls below 0.3, a height of the inclined portion 44 in the up-down direction is relatively increased. Consequently, the bucket is inevitably thrust into the object to be excavated with an increased resistance, and thus the operation cannot be smoothly performed. Further, since the innermost of the bucket is inevitably defined at a higher level, it may be actually difficult to attach the bucket 32 due to interference with the boom 31 or the like. Further, when the ratio falls below 0.3, the horizontal length A of the first straight portion 43 is relatively reduced, and thus the bucket 32 may be unstably thrust into the object to be excavated.

In contrast, when the ratio exceeds 0.5, the horizontal length of the curve 45 is relatively reduced, and thus the curve 45 is unlikely to have the large bucket radius R. Further, for instance, the object to be excavated cannot be smoothly pushed into the bucket 32, and thus the operation cannot be smoothly performed. When the ratio exceeds 0.5, the length A is relatively increased, and thus the bucket 32 is inevitably thrust into the object to be excavated with an increased resistance.

A stop 53 is provided to a back surface of the second straight portion 46. The stop 53 is a member that is to be deliberately brought into contact with the boom 31 when the wheel loader 1 is in a traveling position (described later). Consequently, the bucket 32, the boom 31, the bell crank 33, and a connection portion of any other link can be restrained from being rattled during traveling, thereby achieving a noiseless stable traveling.

The bent portion 47, which is defined in an upper exterior surface of the bucket 32, is provided near the innermost of the bucket relative to a reinforcing member 54 for reinforcing a back surface of the third straight portion 48 (i.e., behind the reinforcing member 54). The upper exterior surface of the bucket 32 can thus be reinforced over a wide range not only by the bent portion 47 but also by the reinforcing member 54. The bent portion 47 may be appropriately shaped in the practice of the invention. For instance, the bent portion 47 may be bent with a predetermined bend radius or may be sharply bent to create a right-to-left bend line.

The back surface of the third straight portion 48 is provided with the reinforcing member 54. A spill guard 55 continuously extends from a front edge 54F of the reinforcing member 54 to cover the bucket opening from above It should be noted that the spill guard 55 is not a component of the main plate 41 of the bucket 32 in the exemplary embodiment.

In the exemplary embodiment, the second straight portion 46, the bent portion 47 and the third straight portion 48 in combination define a bulging portion 56 continuous in the right-left direction and bulging outward from the bucket 32. A hollow space defined by the bulging portion 56 accounts for a part of a bucket capacity. In other words, although the bucket capacity is inevitably reduced at a lower side of the bucket 32 when the curve 45 subsequent to the inclined portion 44 is defined at a higher level than that of a typical bucket, the bulging portion 56 compensates for the reduction in the bucket capacity.

Description of Traveling Position

Figure 4:
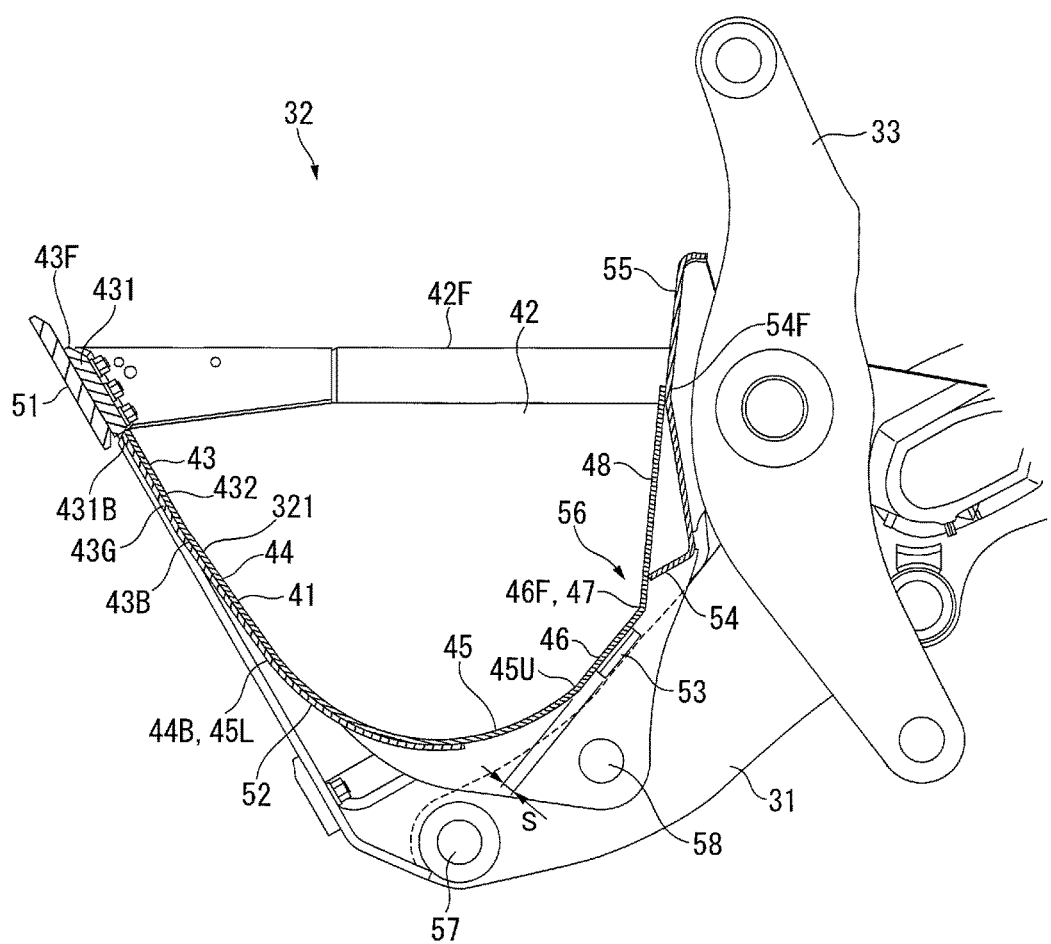
FIG. 4 is a cross sectional view showing a positional relationship between the bucket and a boom in a traveling position.

FIG. 4 shows a positional relationship between the bucket 32 and the boom 31 in the traveling position.

As shown in FIG. 4, in the traveling position, the bucket 32 is tilted at a maximum with the bucket opening facing upward and a front edge 42F of each of the side plates 42 being substantially leveled. In the traveling position, a connection portion 57 where the bucket 32 is pivotally supported at the end of the boom 31 is lifted above a level of the vehicle body 2 above the ground. In the traveling position, the bucket 32 is brought closest to the boom 31 at the majority of the second straight portion 46 including the bent portion 47 with a distance S therebetween being minimized.

A position of the stop 53 corresponds to the position brought closest to the boom 31. The position of the stop 53 is appropriately determined in view of a moment of the boom 31 that supports the bucket 32 via the stop 53. In the exemplary embodiment, the bucket radius R is maximized until the distance S is minimized as long as the stop 53 is situated at the appropriate position.

The bucket 32 is brought closest to the bell crank 33 at a position corresponding to the third straight portion 48. Accordingly, the shape and dimension of the reinforcing member 54 are appropriately determined so that the reinforcing member 54 can fit in such a narrow space.

It should be noted that, in the figures, a reference numeral 57 seen behind the curve 45 of the bucket 32 denotes the connection portion between the bucket 32 and the boom 31 as described above, and a reference numeral 58 denotes a connection portion of a tilt link member (not shown) that connects the lower side of the bell crank 33 and the bucket 32.

In the bucket 32 described above, the bottom plate 321 according to the invention corresponds to a portion of the main plate 41 including the bottom surface 43G. Specifically, the main plate 41 of the bucket 32 of the exemplary embodiment includes: the first straight portion 43 and the inclined portion 44 defining the bottom plate 321 of the bucket 32; and the curve 45, the second straight portion 46 and the third straight portion 48 defining a back surface of the bucket 32.

Drive Mechanism for Working Equipment

FIG. 5 schematically illustrates a drive mechanism for the working equipment 3. The wheel loader 1 includes a working equipment controller 10 (a controller according to the invention), an engine 11, and a power take-off (PTO) 12. The PTO 12 distributes an output from the engine 11 to a travel system for driving the tires 7 and a hydraulic system for driving the working equipment 3.

Arrangement of Travel System

The travel system, which is a mechanism allowing the wheel loader 1 to travel (i.e., the travel device 5), includes a torque converter (T/C) 15 in addition to, for instance, a transmission and an axle (both not shown). A power outputted from the engine 11 is transmitted to the tires 7 through the PTO 12, the torque converter 15, the transmission and the axle.

Arrangement of Hydraulic System

The hydraulic system is a mechanism for driving mainly the working equipment 3 (e.g., the boom 31 and the bucket 32). The hydraulic system includes: a hydraulic pump 16 for the working equipment driven by the PTO 12; hydraulic pilot valves including a bucket operation valve 22 and a boom operation valve 23 provided in a discharge circuit of the hydraulic pump 16; solenoid proportional pressure control valves 24, 25 for the bucket independently connected to pilot-pressure receiving portions of the bucket operation valve 22; and solenoid proportional pressure control valves 26, 27 for the boom independently connected to pilot-pressure receiving portions of the boom operation valve 23.

The solenoid proportional pressure control valves 24 to 27 are connected to a pilot pump (not shown) to independently control the supply of a hydraulic oil to the pilot-pressure receiving portions in accordance with a control signal from the working equipment controller 10.

Specifically, the solenoid proportional pressure control valve 24 switches the bucket operation valve 22 so that the bucket cylinder 34 is retracted to move the bucket 32 in a damping direction. Similarly, the solenoid proportional pressure control valve 25 switches the bucket operation valve 22 so that the bucket cylinder 34 is extended to move the bucket 32 in a tilt direction.

The solenoid proportional pressure control valve 26 switches the boom operation valve 23 so that the boom cylinder 36 is retracted to swing down the boom 31. Similarly, the solenoid proportional pressure control valve 27 switches the boom operation valve 23 so that the boom cylinder 36 is extended to swing up the boom 31.

Thus, the solenoid proportional pressure control valves 24, 25, the bucket operation valve 22 and the bucket cylinder 34 provide a bucket driving unit for rotating the bucket 32.

The solenoid proportional pressure control valves 26, 27, the boom operation valve 23 and the boom cylinder 36 provide a boom driving unit for swinging the boom 31.

Devices Connected to Working Equipment Controller

As shown in FIG. 6, the working equipment controller 10 is connected to a boom lever 410, a bucket lever 420, which are both disposed in the cab 4, a boom angle sensor 440, a bucket angle sensor 450, a boom-bottom pressure sensor 460 (a boom-bottom pressure detector), an engine controller 470, and a transmission controller 480.

The working equipment controller 10 is also connected to an automatic excavation mode inputting unit 531 and a bucket setting unit 532, which are provided to a monitor 430 disposed in the cab 4.

The boom lever 410 includes a lever angle sensor for detecting a lever angle. When an operator operates the boom lever 410, the lever angle sensor detects a lever angle corresponding to displacement of the boom lever 410, and outputs the lever angle in the form of a boom lever signal to the working equipment controller 10.

The bucket lever 420 includes a lever angle sensor for detecting a lever angle. When an operator operates the bucket lever 420, the lever angle sensor detects a lever angle corresponding to displacement of the bucket lever 420, and outputs the lever angle in the form of a bucket lever signal to the working equipment controller 10.

The boom lever 410 is provided with a kickdown switch 411. The kickdown switch 411 is connected to the transmission controller 480. When the kickdown switch 411 is operated, the transmission controller 480 shifts the transmission into a low-speed gear position. For instance, when two gear positions are selectable, the transmission controller 480 shifts the transmission into the first gear position when the kickdown switch 411 is operated.

The automatic excavation mode inputting unit 531 displays an automatic excavation start button on the monitor 430, and outputs an automatic excavation start signal to the working equipment controller 10 when an operator operates the automatic excavation start button.

The type of the bucket 32 attached to the wheel loader 1 is set in the bucket setting unit 532. The bucket 32 may be exchanged depending on, for instance, the intended use of the wheel loader 1. Some buckets attachable as the bucket 32 have different inclination angles θ of the inclined portion 44 relative to the bottom surface 43G of the first straight portion 43. Accordingly, when exchanging the bucket 32, for instance, an operator or a maintenance person inputs the type (e.g., model number) of the currently attached bucket 32 in the bucket setting unit 532, in which the type of the bucket 32 attached before shipment has been set as an initial value. The information set in the bucket setting unit 532 is outputted to the working equipment controller 10. This bucket setting information is used by a threshold setting unit 120 (described later) to set a threshold in accordance with the inclination angle θ.

The boom angle sensor 440, which may include a rotary encoder provided to a connection portion (a support shaft) of the boom 31 relative to the vehicle body 2 shown in FIG. 5, detects a boom angle between the center axis of the boom 31 and a horizontal axis, and outputs the detection signal. The boom angle sensor 440 thus serves as a boom position detecting unit. The center axis of the boom 31, which is represented by a line Y-Y in FIG. 5, connects the connection portion of the boom 31 (i.e., the center of the support shaft) relative to the vehicle body 2 and a connection portion of the bucket 32 (i.e., the center of a bucket support shaft). Specifically, when the line Y-Y in FIG. 5 is set along the horizontal axis, the boom angle sensor 440 outputs a boom angle of zero degrees. Further, the boom angle sensor 440 outputs a positive value when a distal end of the boom 31 is lifted from a position of the zero-degree boom angle, and outputs a negative value when the distal end of the boom 31 is lowered.

The bucket angle sensor 450, which may include a rotary encoder provided to a rotation shaft of the bell crank 33, outputs zero degrees when the bucket 32 is in contact with the ground with the first straight portion 43 of the bucket 32 being horizontal on the ground. Further, the bucket angle sensor 450 outputs a positive value when the bucket 32 is moved in the tilt direction (upward), and outputs a negative value when the bucket 32 is moved in the damping direction (downward).

The boom-bottom pressure sensor 460 detects a bottom-side pressure of the boom cylinder 36. The boom-bottom pressure is increased when the bucket 32 is loaded and decreased when the bucket 31 is unloaded. The boom-bottom pressure is also increased when the bucket 32 is thrust into the object to be excavated (e.g., soil and sand) during an excavation work.

The engine controller 470 communicates with the working equipment controller 10 through a controller area network (CAN), and outputs engine operation information including the speed of the engine 11 to the working equipment controller 10.

The transmission controller 480 communicates with the working equipment controller 10 through the CAN, and outputs FR information and vehicle speed information to the working equipment controller 10, the FR information indicating a travel direction of the wheel loader 1 (i.e., forward or reverse) selected using an FR lever 490, the vehicle speed information being received from a vehicle speed sensor 500. It should be noted that the vehicle speed sensor 500 is configured to detect the vehicle speed based on, for instance, the rotation of drive shafts of the tires 7, and the vehicle speed information detected by the vehicle speed sensor 500 is outputted to the working equipment controller 10 via the transmission controller 480.

Arrangement of Working Equipment Controller

The working equipment controller 10 includes an operating state detecting unit 110, the threshold setting unit 120, a working equipment controlling unit 140, and a storage 150.

Operating State Detecting Unit

The operating state detecting unit 110 determines and detects an operating state based on signals inputted to the working equipment controller 10. Specifically, the operating state detecting unit 110 determines which one of the following states the wheel loader 1 is currently in: an automatic excavation control start state; an auto lift start state; an auto lift termination state; an auto tilt start state; an auto tilt stop state; and an auto tilt termination state.

Threshold Setting Unit

The threshold setting unit 120 sets a threshold, which is to be compared with a detection value of the boom-bottom pressure, based on the inclination angle θ of the inclined portion 44 of the bucket 32. The threshold is used by the operating state detecting unit 110 to detect the operating state.

The threshold setting unit 120 sets the threshold with reference to a correspondence table of inclination angle and threshold stored in the storage 150.

As shown in Table 1, the type (model number) of the bucket 32, the inclination angle θ of the inclined portion 44 of the bucket 32, and corresponding first and second thresholds are stored in the correspondence table to be associated with one another.

Based on the type of the bucket 32, which is determined in accordance with bucket capacity and the blade type of the bucket 32 (e.g., flat blade or zigzag blade), the inclination angle of the inclined portion 44 is determined. The first threshold is mainly used for determining whether or not the wheel loader 1 is in the auto lift start state. The second threshold is mainly used for determining whether or not the wheel loader 1 is in the auto tilt start state.

Thus, when the type of the bucket 32 is inputted from the bucket setting unit 532, the threshold setting unit 120 searches the correspondence table for the inclination angle θ of the bucket 32, and sets the first and second thresholds.

However, when the inclination angle θ of the inclined portion 44 of the bucket 32 is a known fixed value, the thresholds are also fixed values. Therefore, the first and second thresholds may be directly written in a program for determination of the auto lift start state and the auto tilt start state without providing, for instance, the threshold setting unit 120 and/or the correspondence table stored in the storage 150.

TABLE 1

| Bucket Type | Inclination Angle | 1st Threshold | 2nd Threshold |
| --- | --- | --- | --- |
| A50 | 6° | T11 | T21 |
| A56 | 6° | T12 | T22 |
| A60 | 5° | T13 | T23 |
| A65 | 5° | T14 | T24 |
| B47 | 6° | T15 | T25 |
| B50 | 6° | T16 | T26 |
| B65 | 5° | T17 | T27 |
| B70 | 5° | T18 | T28 |

It should be noted that it is not requisite that the first and second thresholds are set with reference to Table 1, but, for instance, the first and second thresholds may each be determined by substituting the capacity of the bucket 32 and the inclination angle θ into a predetermined equation representing a relationship between the inclination angle θ of the inclined portion 44 and the first (second) threshold.

Working Equipment Controlling Unit

Based on the various pieces of inputted information and the detection result from the operating state detecting unit 110, the working equipment controlling unit 140 outputs control signals to the solenoid proportional pressure control valves 24 to 27 to actuate the bucket 32 and/or the boom 31.

Further, the working equipment controller 10 outputs an indicator command and/or a buzzer command to the monitor 430. Upon reception of the indicator command, the monitor 430 controls the display of an indicator 535 provided to the monitor 430 to present information to an operator.

Upon reception of the buzzer command, the monitor 430, which is provided with a buzzer 536 capable of beeping, activates the buzzer 536 to beep to warn an operator.

The storage 150 stores various pieces of data inputted to the working equipment controller 10 and various parameters required for controlling the working equipment 3 in addition to the correspondence table.

Process of Automatic Excavation Work

Next, an operation performed when an automatic excavation mode is selected by the automatic excavation mode inputting unit 531 will be described with reference to FIG.

7. The automatic excavation work performed by the wheel loader 1 includes the following plurality of operation steps as shown in FIG. 7.

1. Kickdown

When the bucket 32 brought into contact with the ground with the bottom surface 43G of the bucket 32 being horizontal is thrust into the object to be excavated by an operator's operation, and thus the boom-bottom pressure satisfies predetermined conditions, the transmission controller 480 performs automatic kickdown to automatically shift the transmission into the first gear position. An operator may perform the kickdown by pushing a button as needed.

2. Auto Lift

When the bucket 32 is thrust into the object to be excavated, and the boom-bottom pressure and the vehicle speed satisfy auto lift conditions, the working equipment controller 10 performs auto lift to automatically lift the boom 31.

3. Auto Tilt

When the boom-bottom pressure and the vehicle speed satisfy auto tilt conditions, the working equipment controller 10 performs auto tilt to rotate the bucket 32 while the boom 31 is stopped.

When it is detected that the bucket 32 is in a tilt-end state based on a tilt angle of the bucket 32 or when the wheel loader 1 is operated by an operator to travel not forward but rearward or be in a neutral state, the working equipment controller 10 terminates the automatic excavation work.

Automatic Excavation Control

A process performed by the working equipment controller 10 when the automatic excavation mode is selected will be described with reference to a flowchart of FIG. 8.

The working equipment controller 10 determines whether or not the automatic excavation start signal is inputted from the automatic excavation mode inputting unit 531, i.e., whether or not the automatic excavation mode is turned "ON" (Step S1). When the automatic excavation mode is "OFF", the determination result by the working equipment controller 10 is "NO" in Step S1. The working equipment controller 10 then outputs the indicator command to the monitor 430 so that an indicator indicating that the automatic excavation mode is on (if any) disappears from the monitor 430 (Step S2). The working equipment controller 10 repeats Steps S1 and S2 until the automatic excavation mode is turned "ON".

When the automatic excavation mode is "ON", the determination result by the working equipment controller 10 is "YES" in Step S1. The working equipment controller 10 then outputs the indicator command to the monitor 430 so that the monitor 430 displays the indicator indicating that the automatic excavation mode is on (Step S3).

In response to the kickdown operation or the automatic kickdown, the working equipment controller 10 outputs a kickdown command to the transmission controller 480 so that kickdown is performed to keep the transmission in the first gear position (Step S4). Consequently, a tractive force is increased while the vehicle speed of the wheel loader 1 is lowered. Thus, the wheel loader 1 is thrust into the object to be excavated with the bucket 32 being horizontal by the tractive force to excavate the object to be excavated as shown in FIG. 7.

When the transmission is shifted into the first gear position by the kickdown, the working equipment controller 10 determines whether or not auto lift start conditions are satisfied (Step S5).

Specifically, the operating state detecting unit 110 of the working equipment controller 10 determines that the auto lift start conditions are satisfied when the boom-bottom pressure inputted from the boom-bottom pressure sensor 460 is equal to or more than the first threshold and the vehicle speed information inputted from the transmission controller 480 is less than a determination value.

In other words, when the bucket 32 is thrust into the object to be excavated, the vehicle speed of the wheel loader 1 falls below the determination value. Further, the object to be excavated (e.g., soil and sand) entering the bucket 32 increases the boom-bottom pressure. Accordingly, when the boom-bottom pressure is equal to or more than first threshold and the vehicle speed is less than the determination value, the bucket 32 can be determined to be thrust into the object to be excavated.

When the determination result is "NO" in Step S5, the working equipment controller 10 repeats the determination step of Step S5.

When the determination result is "YES" in Step S5, the working equipment controlling unit 140 of the working equipment controller 10 outputs control signals to control the solenoid proportional pressure control valves 24 to 27 so that the lift of the boom 31 is started and the bottom surface 43G of the bucket 32 is kept horizontal (Step S6).

After the boom lift is started in Step S6, the working equipment controller 10 determines whether or not auto lift termination conditions are satisfied (Step S7).

Specifically, when the boom-bottom pressure is increased to the second threshold or more or when the boom angle of the boom 31 is increased to a determination value or more, the operating state detecting unit 110 of the working equipment controller 10 determines that the auto lift termination conditions are satisfied.

In other words, the auto lift, which is performed to increase a grip force of the tires 7 during the excavation work, is terminated when the boom 31 is determined to be lifted to a predetermined level by determining that the boom angle is increased to the determination value or more. Even when the boom 31 is not lifted to the predetermined level, the auto lift is terminated as long as the boom-bottom pressure is increased to the second threshold or more (i.e., auto tilt start conditions are satisfied).

When the determination result is "NO" in Step S7, the working equipment controller 10 repeats the determination step of Step S7.

When the determination result is "YES" in Step S7, the working equipment controlling unit 140 of the working equipment controller 10 outputs control signals to the solenoid proportional pressure control valves 24 to 27 so that the lift of the boom 31 (boom lift) is stopped (Step S8).

After the boom lift is stopped in Step S8, the working equipment controller 10 determines whether or not the auto tilt start conditions are satisfied (Step S9).

Specifically, the operating state detecting unit 110 of the working equipment controller 10 determines that the auto tilt start conditions are satisfied when the boom-bottom pressure is increased to the second threshold or more and the vehicle speed information is less than the determination value.

When the determination result is "NO" in Step S9, the working equipment controller 10 repeats the determination step of Step S9.

When the determination result is "YES" in Step S9, the working equipment controlling unit 140 of the working equipment controller 10 outputs a control signal to the solenoid proportional pressure control valve 25 so that the tilt of the bucket 32 is started (Step S10).

After the tilt of the bucket 32 is started in Step S10, the working equipment controller 10 determines whether or not auto tilt stop conditions are satisfied (Step S11).

Specifically, the operating state detecting unit 110 of the working equipment controller 10 determines that the bucket stop conditions are satisfied when an increase in the boom-bottom pressure from the time when the tilt of the bucket 32 is started becomes a determination value or more or when the vehicle speed is increased to the determination value or more.

When the determination result is "NO" in Step S11, the working equipment controller 10 determines whether or not auto tilt termination conditions are satisfied (Step S12).

Specifically, when it is detected that the bucket 32 is in the tilt-end state or when the wheel loader 1 travels rearward or is in the neutral state (i.e., the wheel loader 1 does not travel forward), the operating state detecting unit 110 of the working equipment controller 10 determines that the auto tilt conditions are satisfied. It should be noted that when the bucket 32 is in the "tilt-end state", the bucket cylinder 34 is extended at a maximum, and thus the bucket 32 cannot be further tilted. The tilt-end state is thus detectable by, for instance, the bucket angle sensor 450.

Thus, when the tilt-end state is detected during the auto tilt motion (NO in Step S11), the determination result is "YES" in Step S12. Therefore, the working equipment controller 10 terminates the control under the automatic excavation mode.

Simultaneously, the working equipment controller 10 informs an operator of the termination of the automatic excavation mode using the indicator 535 and the buzzer 536 of the monitor 430.

When the determination result is "NO" in Step S12, the working equipment controller 10 again performs the determination step of Step S7.

When the determination result is "YES" in Step S11, the working equipment controller 10 stops the tilt of the bucket 32 (Step S13).

After the bucket tilt is stopped in Step S13, the working equipment controller 10 determines whether or not the auto tilt termination conditions are satisfied (Step S14).

When the determination result is "NO" in Step S14, the working equipment controller 10 again performs the determination step of Step S9 to determine whether or not the auto tilt start conditions are satisfied, and continues the control. Thus, when the auto tilt start conditions are again satisfied (the determination result "YES" in Step S9), the working equipment controller 10 repeats Steps S10 to S14. The tilt motion is thus usually repeated for two or three times, approximately.

When the determination result is "YES" in Step S14, the working equipment controller 10 terminates the control under the automatic excavation mode in the same manner as when the determination result is "YES" in Step S12.

Boom-Bottom Pressure and Thrusting Distance

FIG. 9 is a graph comparing actual measured values of the boom-bottom pressure variable with a thrusting distance between when the bucket 32 including the inclined portion 44 with the inclination angle θ of six degrees is used and when a bucket with an inclination angle θ of zero degrees (i.e., a bucket including no inclined portion) is used. Here, the type of the bucket 32 is A50, a first threshold T11 is 16 MPa, and a second threshold T21 is 27 MPa.

As is evident from the graph of FIG. 9, when the bucket 32 including the inclined portion 44 is used, an increase ratio of the boom-bottom pressure is large. Further, the auto lift start conditions are satisfied, i.e., the boom-bottom pressure exceeds the first threshold T11, at an early timing (a thrusting distance L1) when the bucket 32 according to the exemplary embodiment is used as compared with when a bucket including no inclined portion is used (a thrusting distance L2).

Specifically, in the exemplary embodiment, the auto lift start conditions are satisfied before the thrusting distance L1 reaches 1500 mm.

Accordingly, when a bucket not including the inclined portion 44 is used, a first threshold T01 needs to be set at approximately 12 MPa so that the auto lift start conditions are satisfied at the thrusting distance L1.

Consequently, when a bucket including no inclined portion is used, and thus the low threshold T01 is set as the auto lift start conditions, the excavation work is unlikely to be distinguished from a grading work. In contrast, when the high threshold T11 is set, the thrusting distance L2 necessarily becomes long due to the delay of the timing when the auto lift start conditions are satisfied. The control may thus be started after the travel of the wheel loader 1 is stopped, which results in a lowered control efficiency.

Further, when the bucket 32 according to the exemplary embodiment is used, the auto tilt start conditions are satisfied, i.e., the boom-bottom pressure exceeds the second threshold T21, at an early timing (thrusting distance) as compared with when a bucket including no inclined portion is used. The auto tilt motion can thus be started early.

Advantage(s) of Exemplary Embodiment(s)

In the above exemplary embodiment, the bucket 32 including the inclined portion 44 increases a horizontal reaction force acting on the boom 31 from the object to be excavated (e.g., soil and sand) via the bucket 32 when the bucket 32 is thrust into the object to be excavated, so that an increase ratio of the boom-bottom pressure of the boom cylinder 36 can be increased. Thus, the first threshold can be set high so that the excavation work is distinguishable from a grading work.

Further, as compared with when a bucket including no inclined portion is used, a distance for the boom-bottom pressure to exceed the first or second threshold can be shortened, so that the working equipment controller 10 can start the auto lift motion of the boom 31 or the auto tilt motion of the bucket 32 at an early timing. Thus, the lift motion or the tilt motion under the automatic control is likely to be started at an optimal thrusting distance of the bucket 32 relative to the object to be excavated, thereby improving the operating efficiency under the automatic excavation control.

In particular, the first and second thresholds are set in accordance with the inclination angle θ of the inclined portion 44. Therefore, even when a variation in the boom-bottom pressure is changed with a change in the inclination angle θ, the lift motion or the tilt motion can be started at an optimal timing in accordance with the variation, thereby improving the operating efficiency under the automatic excavation control.

Since the bucket 32 including the inclined portion 44 increases the horizontal reaction force, the speed of the wheel loader 1 is lowered. An operator can thus easily operate the wheel loader 1 at the right timing, which results in an improvement in operability. Therefore, the operating efficiency can be improved under the automatic excavation control.

The curve 45 of the bucket 32 has a bucket radius larger than a typical one, and the inclined portion 44 is provided close to the bucket opening relative to the curve 45. Consequently, as the bucket 32 is thrust forward for a shoveling work or an excavation work, the object to be excavated, which has been pushed into the bucket 32 to reach the curve 45 through the inclined portion 44, can further slide to rise along the curve 45 at the innermost of the bucket as shown by a two-dot chain line and a two-dot chain line arrow C in FIG. 3. The object to be excavated can thus be pushed into the bucket 32 more and more without being blocked.

Further, the curve 45 at the innermost of the bucket is defined at a high level by the presence of the inclined portion 44 provided therebefore. Consequently, in the exemplary embodiment, although the bucket capacity is reduced at the lower portion of the bucket in spite of the large bucket radius R, the upper portion of the bucket 32, i.e., the bulging portion 56 defined by the second and third straight portions 46, 48 and the bent portion 47, can compensate for this reduction Therefore, the large bucket radius R can accelerate, in combination with the bulging portion 56, the movement of the object to be excavated into the bucket through the upper portion of the bucket opening as shown by a two-dot chain line arrow D.

An advantage of the large bucket radius R lies not in simply increasing the bucket capacity, but in facilitating the object to be excavated to be pushed toward the innermost of the bucket, thereby effectively utilizing the inherent bucket capacity and ensuring a sufficient workload.

Further, the bucket 32, which is provided with the first straight portion 43 near the bucket opening, can be thrust into the object to be excavated horizontally straight forward for a shoveling work or an excavation work, which results in a stable operation.

The bucket 32 of the exemplary embodiment is suitable for an object to be excavated that should be smoothly pushed to the curve 45 without sliding or rolling down the inclined portion 44. Such an object to be excavated may be crushed to have, for instance, a diameter of approximately 40 mm.

An object to be excavated with a large diameter cannot be smoothly pushed into the bucket 32, and thus the wheel loader 1 may get stuck. However, a downward force is generated in the bucket 32 by the presence of the inclined portion 44, and thus a load is applied on the front wheels of the wheel loader 1 to increase a tractive force, thereby facilitating an operation.

Incidentally, it should be understood that the scope of the invention is not limited to the above-described exemplary embodiment(s) but includes any modifications and improvements compatible with the invention.

For instance, it is not requisite that the inclination angle θ of the inclined portion 44 of the bucket 32 is six degrees. However, the inclination angle θ is preferably in a range from four degrees to eight degrees. In FIG. 10, estimated values of the boom-bottom pressure at the time of the inclination angle θ of the inclined portion 44 being eight degrees are shown by a dotted line, and estimated values at the time of the inclination angle θ being four degrees are shown by a chain double-dashed line.

Apparently, the start of the auto lift control or the auto tilt control is delayed when the inclination angle θ of the inclined portion 44 is less than four degrees in the same manner as when no inclined portion is provided (i.e., the inclination angle θ is zero degrees). Thus, the control is highly likely to be started after the travel of the wheel loader 1 is stopped, which results in a lowered control efficiency.

In contrast, when the inclination angle θ of the inclined portion 44 is more than eight degrees, the inclined portion 44 provides a large load to increase an increase ratio of the boom-bottom pressure. The control is thus likely to be started before the bucket is sufficiently thrust. Accordingly, the inclination angle of the inclined portion 44 is preferably in a range from four degrees to eight degrees.

The working equipment controller 10 of the exemplary embodiment determines the start of the auto lift control or the auto tilt control based on the boom-bottom pressure. Alternatively, the working equipment controller 10 may determine the start of the control by comparing the horizontal reaction force applied to the wheel loader 1 when the bucket 32 is thrust into an object to be excavated with a threshold set in accordance with the inclination angle θ of the inclined portion 44, the horizontal reaction force being detected by a horizontal reaction force detector.

The horizontal reaction force detector may be the vehicle speed sensor 500 for detecting the vehicle speed, a device for detecting deceleration (acceleration), or a device for detecting a speed ratio (vehicle speed/engine speed). Alternatively, for instance, a relationship between accelerator opening degree and vehicle speed or a tractive force (a torque converter stall ratio) may be used. In other words, any factor may be used as long as a thrust resistance (i.e., the horizontal reaction force) applied when the bucket 32 is thrust into an object to be excavated can be detected.

For instance, as shown in FIG. 11, the bucket 32 including the inclined portion 44 increases the horizontal reaction force applied when the bucket 32 is thrust into an object to be excavated. A decrease ratio of the vehicle speed is thus increased as compared with an instance in which a bucket includes no inclined portion. Therefore, when, for instance, a vehicle speed of 5 km/h is set as the first threshold, a thrusting distance L3 where the vehicle speed of the wheel loader 1 using the bucket 32 falls to or below the first threshold is shorter than a thrusting distance L4 of a bucket including no inclined portion, and thus the auto lift control or the auto tilt control can be started at an earlier timing.

Further, as shown in FIG. 12, the bucket 32 including the inclined portion 44 allows for a quick change in deceleration (acceleration) as compared with a bucket including no inclined portion. Therefore, when, for instance, a deceleration of 10 m/s$^2$ is set as the first threshold, a thrusting distance L5 where the vehicle speed of the wheel loader 1 using the bucket 32 falls to or below the first threshold is shorter than a thrusting distance L6 of a bucket including no inclined portion, and thus the auto lift control or the auto tilt control can be started at an earlier timing.

Further, as shown in FIG. 13, the bucket 32 including the inclined portion 44 allows for a quick change in speed ratio (vehicle speed/engine speed) as compared with a bucket including no inclined portion. Therefore, when, for instance, a speed ratio of 2.8 is set as the first threshold, a thrusting distance L7 where the vehicle speed of the wheel loader 1 using the bucket 32 falls to or below the first threshold is shorter than a thrusting distance L8 of a bucket including no inclined portion, and thus the auto lift control or the auto tilt control can be started at an earlier timing.

In the exemplary embodiment, the first straight portion 43 includes the plate-shaped attachment portion 431 having the lower front edge 43F and the plate-shaped bottom 432 subsequent thereto. Alternatively, as shown in FIG. 14, the whole of the first straight portion 43 may consist solely of a plate-shaped attachment portion 433 made of a single thick steel plate, the plate-shaped attachment portion 433 including a portion comparable to the plate-shaped bottom 432. Further, the bucket 32 may have a zigzag blade instead of a flat blade.

In the exemplary embodiment, the inclined portion 44 is flat, but may be slightly curved (almost flat) according to the invention.

The invention is applicable to not only a wheel loader, but also a backhoe loader, a skid steer loader and the like.

The invention claimed is:

1. A working vehicle comprising:
a vehicle body;
a boom swingably supported by the vehicle body;
a bucket swingably supported by the boom;
a boom driving unit configured to swing the boom, the boom driving unit comprising a boom hydraulic cylinder;
a bucket driving unit configured to swing the bucket;
a boom-bottom pressure detector configured to detect a boom-bottom pressure of the boom hydraulic cylinder; and
a controller configured to control at least one of a lift motion of the boom and a tilt motion of the bucket,
the bucket comprising a bottom plate,
the bottom plate comprising an inclined portion inclined upward toward an innermost of the bucket when a bottom surface of the bottom plate is set horizontal,
the controller controlling the lift motion or the tilt motion by comparing a threshold set in accordance with an inclination angle of the inclined portion relative to the bottom surface with the boom-bottom pressure.

2. The working vehicle according to claim 1, wherein the bottom plate further comprises a straight portion extending continuously from a front edge of the inclined portion.

3. The working vehicle according to claim 1, wherein the inclination angle is in a range from four degrees to eight degrees.

4. The working vehicle according to claim 1, wherein the controller controls the lift motion of the boom by comparing a first threshold set in accordance with the inclination angle of the inclined portion relative to the bottom surface with the boom-bottom pressure, and controls the tilt motion of the bucket by comparing a second threshold set in accordance with the inclination angle of the inclined portion relative to the bottom surface with the boom-bottom pressure.

5. A working vehicle comprising:
a vehicle body;
a boom swingably supported by the vehicle body;
a bucket swingably supported by the boom;
a boom driving unit configured to swing the boom;
a bucket driving unit configured to swing the bucket;
a horizontal reaction force detector configured to detect a horizontal reaction force applied when the bucket is thrust into an object to be loaded in the bucket; and
a controller configured to control at least one of a lift motion of the boom and a tilt motion of the bucket,
the bucket comprising a bottom plate,
the bottom plate comprising an inclined portion inclined upward toward an innermost of the bucket when a bottom surface of the bottom plate is set horizontal,
the controller controlling the lift motion or the tilting motion by comparing a threshold set in accordance with an inclination angle of the inclined portion relative to the bottom surface with the horizontal reaction force.

* * * * *